United States Patent [19]

Chainer et al.

[11] Patent Number: 4,553,259
[45] Date of Patent: Nov. 12, 1985

[54] SEMI-INDEPENDENT SHIFTING TECHNIQUE FOR SIGNATURE VERIFICATION

[75] Inventors: Timothy J. Chainer, Mahopac; Steven C. Gundersen, Peekskill; Thomas K. Worthington, South Salem, all of N.Y.

[73] Assignee: International Business Machines Corporation, Armonk, N.Y.

[21] Appl. No.: 567,202

[22] Filed: Dec. 30, 1983

[51] Int. Cl.⁴ .............................................. G06K 9/22
[52] U.S. Cl. .......................................... 382/3; 382/59
[58] Field of Search ............................... 382/3, 13, 59

[56] References Cited

U.S. PATENT DOCUMENTS

3,983,535 9/1976 Herbst et al. ............................ 382/3

Primary Examiner—Leo H. Boudreau
Assistant Examiner—Michael M. Murray
Attorney, Agent, or Firm—Roy R. Schlemmer

[57] ABSTRACT

A signature verification system includes means for obtaining acceleration data and pressure data related to a given signature and means for comparing that data with reference data previously obtained from an identified signer. The correlations between segments of a reference pressure signal and a sample pressure signal are computed. This process involves successively measuring the correlation as the two segments are shifted with respect to each other. The amount of the shifts that produce the maximum correlations between the pressure signal segments is stored in memory. The corresponding segments of acceleration data are shifted with respect to one another by an amount which is ±1 time units of the stored shift values during subsequent correlations of the acceleration data. The overall performance of the signature verification system is improved both in terms of processing time and in error rate as compared to the independent shifting method and in error rate with a minor increase in computation time as compared to the pressure only shifting method.

3 Claims, 4 Drawing Figures

FIG. 1A TIME in seconds × 80

FIG. 1B TIME in seconds × 80

FIG. 1C TIME in seconds × 80

FIG. 2

SEMI-INDEPENDENT SHIFTING TECHNIQUE FOR SIGNATURE VERIFICATION

CROSS REFERENCE TO RELATED APPLICATION

This application is directed to an invention that is an improvement to the invention disclosed in concurrently filed application Ser. No. 567,201 filed by Chainer and assigned to the assignee of this application.

DESCRIPTION

1. Field of the Invention

The present invention relates generally to the field of signature verification for authenticating the signer of a document, and more particularly to a semi-indenpendent shifting technique used in the verification procedure which not only reduces the number of multiplications necessary to perform the overall correlation with no significant loss in correlation accuracy but also improves system performance.

2. Background of the Invention

There has always been a need in society for verifying a person's identity for a variety of purposes. Modern day scientific technology has adopted the widespread use of computers and related mechanisms for the purposes of giving credit, performing electronic funds transfer, and so forth. In all facets of the financial community including the retail industry, securities industry, banking and the like, sums of money, securities and/or materials are transferred between owners based on the reliance of one person on the purported identity of another. Electronic systems including various cryptographic instrumentalities together with secret identity numbers or keys provide a certain amount of security; however, the amount of security is predicated upon the degree of secrecy with which one is able to secure his own special identification key. Obviously, once a person's key is learned by another, presumably an unauthorized person, the other person may falsely assume his identity for a wide variety of electronic applications.

Identity verification by means of signatures has long been known in the art; however, most known systems have various shortcomings. Simply matching the appearance of two signatures is not satisfactory as expert forgers can usually duplicate the appearance of a person's signature as well as the person himself. The result of this is that when an expert forger is involved, even expert document examiners are frequently unable to discover that the signature is forged.

Recent developments in the field of automatic signature verification such as exemplified by U.S. Pat. No. 3,983,535 of Herbst et al and U.S. Pat. No. 4,128,829 of Herbst et al make the concept of personal identification via computer based signature analysis practical. The invention disclosed in U.S. Pat. No. 3,983,535 is based on the discovery that the accelerations of the stylus, which are proportional to the muscle forces exerted by the signer, are of predetermined consistent durations when forming particular strokes in a habitual signature. The nature of the process gives rise to various distortions in the time axis; e.g. pauses between sections of the name, skipped strokes, decorative rubrics, and the like. Thus, the signal is marked by regions of high correlation of unknown duration separated by variable regions of low correlation. Accordingly, the invention in U.S. Pat. No. 3,983,535 dealt with a method of regional correlation which registered these regions based initially on stylus contact and then shifting the regions individually to find the maximal of the correlation function weighted to penalize shifting. The results were then combined to make an overall verification decision.

The signature verification method disclosed in U.S. Pat. No. 3,983,535 was based on a single acceleration parameter of the signature dynamic, but as disclosed in U.S. Pat. No. 4,128,829, an even greater discrimination in the verification operation is possible using two orthogonally disposed (e.g. X and Y axes) acceleration components together with the pressure patterns which are produced during the writing of the signature and utilizing all three of these individual parameters in the correlation operation. The invention disclosed in U.S. Pat. No. 4,128,829 retained the concept of segmenting the sample and reference signatures, correlating individual segment pairs utilizing a series of successive shifts to obtain the maximum possible correlation, weighting the correlations, and finally combining the individual correlation statistics for all segments. An example of a pen that may be used in the Herbst et al verification system is disclosed in U.S. Pat. No. 4,142,175 of Herbst et al. This pen produces electrical signals proportional to accelerations in the X and Y axes and an electrical signal proportional to the pen point pressure along the Z axis.

According to the Herbst et al procedure, reference acceleration and pressure signals are stored in memory in the electronic computer. Actually, as will be understood by those skilled in the art, digital representation of the acceleration and pressure signals are stored, and the acceleration and pressure signals produced by the pen when used to write a signature are also digitized so that all the arithmetical processing is performed digitally. In a typical system, when a customer opens an account, a signature acquisition feature on a computer terminal prompts the customer to sign his or her name several times. This produces signature data that is transmitted to the computer which selects the reference signals that are stored. Both the reference signals and the signals from the pen produced by a person whose signature is to be verified are segmented as a function of pen lifts which are detected by the pressure signal becoming zero. Pen lifts are critical to good correlation scores as they represent reproducible timing marks in the signature. The segmented acceleration and pressure signals from the pen are then compared with the corresponding reference acceleration and pressure signal segments using the correlation algorithm disclosed in U.S. Pat. No. 3,983,535 of Herbst et al. This correlation algorithm involves shifting the acceleration and pressure signal segments with respect to their corresponding reference segments in order to achieve maximum correlation. This process is carried out independently for each of the acceleration and pressure segments and results in a very high recognition ratio. However, since the correlation function is approximated by the summation of a plurality of products, the procedure can be very time consuming resulting in delays which can be annoying to customers whose signatures are being verified. This problem can be overcome by using parallel, pipelined processors, but this is expensive.

In the above-referenced patent application Ser. No. 567,201 of Chainer et al, pressure only shifting technique is disclosed which reduces the number of multiplications necessary to perform the overall correlation by a factor of four. In this technique, the pressure signal shift is detemined as before but instead of independently shifting the acceleration signal for maxmimum correlation, the pressure signal shift is used as the shift for the acceleration shift. This procedure significantly reduces the computation time and removes a degree of freedom from forgery attempts with the result that the overall system performance is improved. Despite this, efforts have continued to further enhance the system performance.

SUMMARY OF THE INVENTION

It is therefore an object of the present invention to provide an improved technique for correlating the acceleration and pressure signals in a signature verification system.

It is another object of the invention to provide an improved signature verification system having enhanced performance over that employing the pressure only shift technique for performing the correlation processing.

The foregoing and other objects of the invention are accomplished by a semi-independent shifting technique that enhances system performance with only a modest increase in computation time. This technique consists of finding the shift which gives the maximum pressure correlation value as before, but instead of just using this value of shift, the acceleration correlation is computed for relative shifts of 0, +1, −1 from this value. This technique yields approximately a 5% average increase in acceleration score.

BRIEF DESCRIPTION OF THE DRAWINGS

The foregoing and other objects, aspects and advantages of the invention will be better understood from the following detailed description with reference to the accompanying drawings, in which.

DETAILED DESCRIPTION OF THE PREFERRED EMBODIMENT OF THE INVENTION

The present invention is practiced using the basic algorithm in the above referenced U.S. Pat. No. 3,983,535 of Herbst et al which is incorporated herein by reference. According to that algorithm, a d.c. pressure signal is measured and periods of zero pressure are detected to determine pen lifts and thereby segment the acceleration and pressure signals. The basic algorithm may be modified by using the segmentation technique disclosed in application Ser. No. 567,201 filed concurrently herewith by Chainer et al, entitled "An Improved Segmentation Algorithm for Signature Verification" and assigned to the assignee of this application. In the Worthington et al application a signal is produced which is representative of the first time derivative of pressure forces. In either case, the basic Herbst et al verification technique involves segmenting the acceleration and pressure signals which were produced by a known person when writing his or her signature and stored as reference signals. Then, at a later time, a person whose signature is to be verified writes his or her signature to produce acceleration and pressure signals which are segmented and compared to the reference signals. The process of comparing involves individually shifting the members of each corresponding segment pair relative to one another in order to achieve the maximum correlation of each corresponding segment pair. A running account of the maximum cross correlation values for all the segment pairs of the two signatures are kept, and these maximum values are combined to produce a resultant correlation value that is utilized as a verification indication.

Figure 1A:
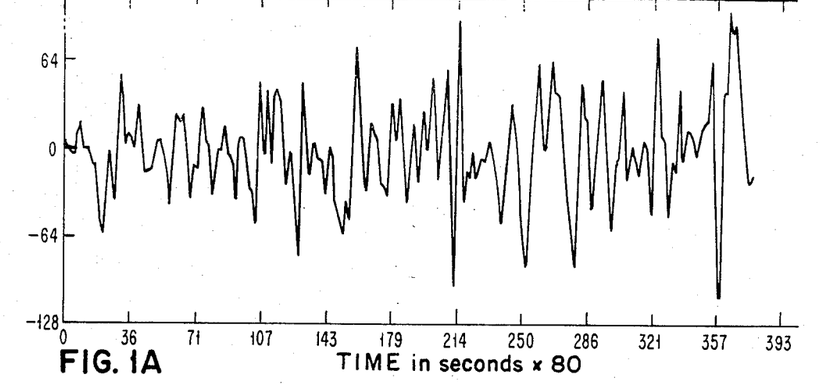
FIGS. 1A, 1B and 1C are oscillographs of specimen acceleration and pressure signals which are typical of those produced by a pen in a signature verification system.
Figure 1B:
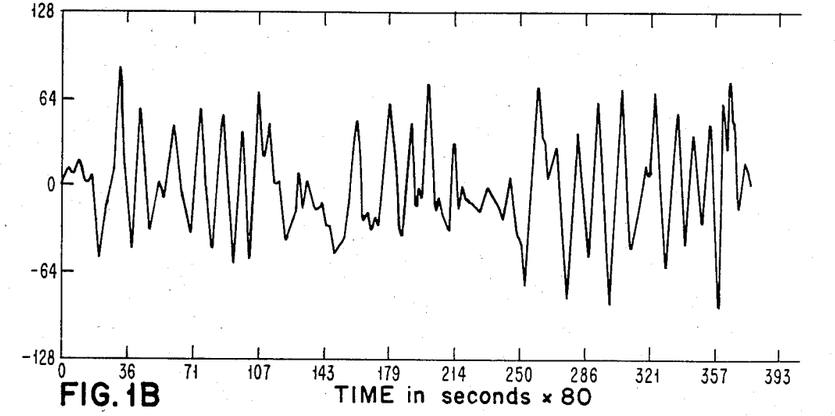
Figure 1C:
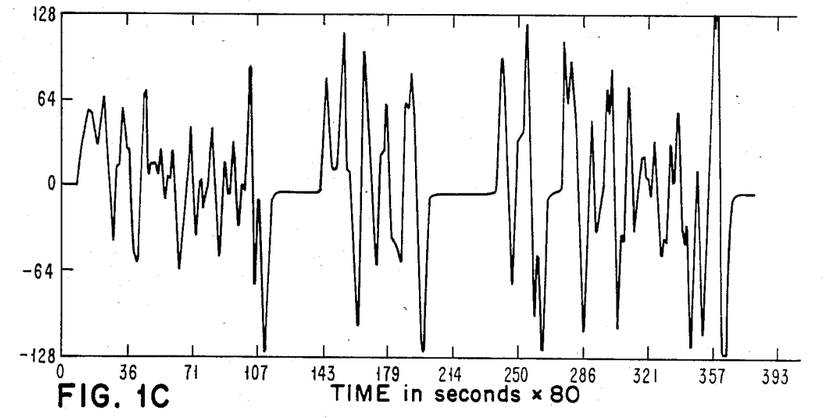

FIGS. 1A and 1B show measured X and Y acceleration data, while FIG. 1C shows measured first time derivative of the pressure. In FIG. 1C it will be observed that there are three obvious quiet regions which are indicative of pen lifts. The same would be true if FIG. 1C showed the pressure signal instead of the first time derivative. In either case, the measured pressure signal is analyzed according to U.S. Pat. No. 3,983,535 of Herbst et al or the measured first time derivative of the pressure is analyzed according to application Ser. No. 567,201 of Chainer et al to determine the actual occurrences of pen lifts in order to facilitate segmenting the acceleration and pressure signals. Then, according to the Herbst et al procedure, the acceleration signal segment pairs and the pressure signal segment pairs are individually shifted to achieve maximum correlation and, as will be appreciated from the complexity of the measured signals shown in FIGS. 1A to 1C, this involves a considerable amount of processing.

According to the invention described in the above referenced application Ser. No. 567,201 of Chainer et al, only the pressure signal segments are shifted to find the maximum correlation between segment pairs. The amount of the shifts required to achieve the maximum correlation between each pressure signal segment pair are then used to correlate the corresponding acceleration signal segment pairs. In other words, there is no independent shifting of the acceleration signal segment pairs to achieve maximum correlation between these pairs. Rather, it is assumed that the shifts required for the corresponding pressure signal segment pairs will produce the maximum correlation values for the acceleration signal segments.

Figure 2:
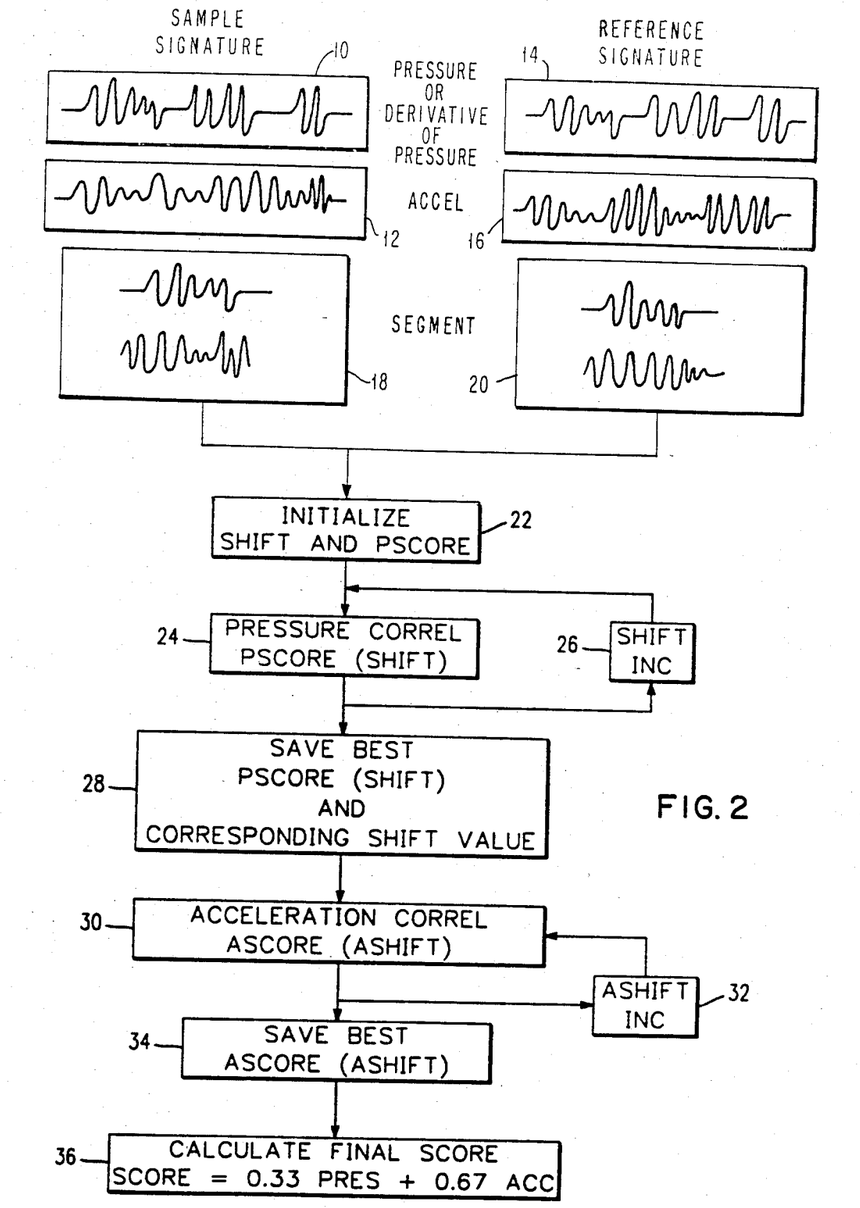
FIG. 2 is a flow chart illustrating the improved shifting technique according the invention.

The process is illustrated by the flow chart shown in FIG. 2. The data to be analyzed are the sample pressure signal or derivative of the pressure signal indicated by block 10 and the complex acceleration signal indicated by block 12. These are to be compared with reference data comprising a pressure signal or derivative of the pressure signal indicated by block 14 and the complex acceleration signal indicated by block 16. The reference data is typically stored in a computer data base and was originally input when a person enrolled in the system. The sample data is also stored in memory for the purpose of performing the verification analysis. As in the Herbst et al procedure, both the sample data and the reference data are segmented in order to facilitate the identification of regions of high correlation probability. This is indicated by blocks 18 and 20 respectively. Actually, the segmenting of the sample and reference data may not be performed contemporaneously as this tends to increase the processing time. Instead, the reference data may be stored in the data base in segmented form.

When segmented sample and reference data are ready for the process, then the first step is to initialize both the shift counter and the P score register as indicated in block 22. Then the pressure correlation between the first corresponding pressure segment pairs is computed, the P score stored in the P score register with the corresponding shift count value, and the pressure segments of the pair are shifted relative to one another. This is indicated by block 24, and this process is repeated according to a predetermined pattern as indicated by block 26. During this process, the best P score and corresponding shift value are saved as indicated by block 28. This is done for each pair of pressure segments so that there is accumulated not only the best P scores for each pair, but also the shift values which produced those scores. Then, according to the present invention, these shift values are used to perform the acceleration segment pair correlations. This is indicated in block 30. The acceleration segment pair correlations are performed for relative shifts of 0, +1, −1 from the shift values determined in the pressure signal correlation process as indicated by the loop between block 30 and 32. The maximum acceleration score for each segment is saved as indicating by block 34. The individual correlation statistics are then combined to produce a final score as indicated in block 36. Clearly, this semi-independent shifting technique increases the computation time; however, the increase in score and the accompanying increase in system performance indicate that the extra computation time is justified. Empirical studies show that a shift of ±1 is optimal in terms of improving Type I (reject) error rate without degrading Type II (forgery) error rate.

The process is implemented in a computer program written in Pascal. The program listings which follow are in three parts which bear the labels MAIN, PRSMOD and ACCMOD. The VERMOD listing is the main line program which is similar to the flow chart shown in FIG. 2. The PRSMOD listing is the pressure correlation shift module, and the ACCMOD listing is the acceleration correlation shift module. Comments for the listings are located in boxes.

```
SEGMENT VERMOD;

PROCEDURE Prsshift    (Reflen,Samlen:INTEGER;
                       Refz,Samz:segdata;
                       VAR Pmax:REAL;
                       VAR Pshmax,Olapp:INTEGER);EXTERNAL;

PROCEDURE Accshift    (Reflen,Samlen:INTEGER;
                       Refx,Refy,Samx,Samy:segdata;
                       VAR Amax:REAL;
                       Pshmax:INTEGER;
                       VAR Olapa:INTEGER);EXTERNAL;

PROCEDURE Versub      (Samsig,Refsig:signature);EXTERNAL;
```

```
Verify Program

Function: To compare two signatures

1) Samsig    Inp    Sample signature
   2) Refsig    Inp    Reference signature
```

```
PROCEDURE VERSUB;

BEGIN  *VERSUB
```

```
THE PRESSURE CORRELATION PROCESS BEGINS
The signature is divided into segments and correlated by segment
There are 'Nsegs' segments, and segment index is 'iseg'.
```

```
FOR iseg := 1 to Nsegs DO
   BEGIN
   j := 2 * iseg;
   n := 0;
   FOR k :=  Pensr (.j - 1.) TO Pensr (.j.) DO
      BEGIN
      n := n + 1;
      Refz (.n.) := Reflz (.k.);
      END;
   Reflen := n;          number of points in REF seg
   n := 0;
```

```
    FOR k := Penss (.j - 1.) TO Penss (.j.) DO BEGIN
        n := n + 1;
        Samz (.n.) := Samlz (.k.);
        END;
    samlen := n;          number of points in SAM seg
```

Call Prsshift to correlate the pressure data for a segment at a particular value of shift. The segments are shifted 15% to find the highest pressure correlation score

```
    Prsshift (Reflen,Samlen,
              Refz,Samz,
              Pmax,Pshmax,Olapp);
```

Save the value of shift which gave the maxium pressure correlation score in the array Pshift

```
    Pshift (.i.) := Pshmax;

Pscore := Pscore + pmax * olapp;

END;   of the segment loop
```

Calculate the final pressure score

```
    Pscore := Pscore / float(lref);
```

THE ACCELERATION CORRELATION PROCESS BEGINS

```
FOR iseg = 1 to Nsegs DO
    BEGIN
    j := 2 * iseg;
    n := 0;
    FOR k :=  Pensr (.j - 1.) TO Pensr (.j.) DO
        BEGIN
        n := n + 1;
        Refx (.n.) := Reflx (.k.);
        Refy (.n.) := Refly (.k.);
        END;
    Reflen := n;              number of points in REF seg
    n := 0;
    FOR k := Penss (.j - 1.) TO Penss (.j.) DO BEGIN
        n := n + 1;
        Samx (.n.) := Samlx (.k.);
        Samy (.n.) := Samly (.k.);
        END;
    samlen := n;          number of points in SAM seg
```

Load the variable Pshmax with the value of shift which gave the max pressure correlation

```
    Pshmax:=Pshift(.i.);
```

Pass Pshmax to the acceleration correlation routine

```
    Accshift (Reflen,Samlen,
              Refx,Refy,Samx,Samy,
              Amax,Pshmax,Olapa);
```

```
    Ascore := Ascore + amax * olapa;

END; | of the segment loop |
```

| Calculate the final acceleration correlation score |

```
  Ascore := Ascore / float(lref);
```

| Calculate the final score |

```
  Score := awt * Ascore + (1.0 - awt) * Pscore;
END;
====
SEGMENT PRSMOD;

PROCEDURE Pcorr (Refsh,Samsh,Len:INTEGER;
                 Samz,Refz:segdata;
                 VAR Pscorr:REAL);EXTERNAL;
```

PROCEDURE PCORR

Function: To calculate the pressure
         correlation score.

|    | Type   | 'I/O ' | Val/Ref | Purpose                  |
|----|--------|--------|---------|--------------------------|
| 1) | Refsh  | Inp    | Ref     | Reference segment offset |
| 2) | Samsh  | Inp    | Ref     | Sample    segment offset |
| 3) | Len    | Inp    | Ref     | No. pts in correlation   |
| 4) | Samz   | Inp    | Ref     | Sample   - z component   |
| 5) | Refz   | Inp    | Ref     | Reference - z component  |
| 6) | Pscorr | Out    | Ref     | Pressure score           |

```
PROCEDURE Prsshift (Reflen,Samlen:INTEGER;
                    Refz,Samz:segdata;
                    VAR Pmax:REAL;
                    VAR Pshmax,Olapp:INTEGER);EXTERNAL;
```

PROCEDURE PRSHIFT

Function: To calculate the number and values
         of the shifts required, and to call
         the pressure correlation routine to determine
         the shift values which produce the
         highest scores.

|    | Type   | 'I/O ' | Val/Ref Purpose              |
|----|--------|--------|------------------------------|
| 1) | Reflen | Inp    | No. pts. in ref segment      |
| 2) | Samlen | Inp    | No. pts. in sam segment      |
| 3) | Refz   | Inp    | Reference - z component      |
| 4) | Samz   | Inp    | Sample    - z component      |
| 5) | Pmax   | Out    | Max score - pressure         |
| 6) | Pshmax | Out    | Shift - max prs score        |
| 7) | Olapp  | Out    | Overlap length - Prs (=Olapa)|

PROCEDURE PRSHIFT;

BEGIN *PRSHIFT

| Determine the number of shifts (n) and create the values ( -n,...,-1,0,1,...n ) |

```
shlen  := round(FLOAT(Max(Reflen,Samlen)) * Shiftpc);
dellen := samlen - reflen;
tauct  := 2 * shlen + 1;
FOR i := 1 TO tauct DO tau (.i.) := i - 1 - shlen;
Pmax   := -1.0;
```

Determine the lower and upper bounds for the REF and SAM vectors. The data between these points will be the only ones involved in the correlations (this obviates the need for a separate padding routine and a lot of wasteful multiplications by zero)

```
FOR i := 1 TO tauct DO
   BEGIN
   lo := MAX(0,MIN(tau(.i.),Samlen-1));
   IF tau (.i.) < 0 THEN up := MIN(Samlen-1,MAX(Reflen+tau(.i.)-1,0))
                   ELSE up := MAX(0,MIN(Reflen+tau(.i.)-1,Samlen-1));
   Len := up - lo + 1;
   IF (lo - tau (.i.))  >= 0 THEN Refsh := lo - tau (.i.)
                             ELSE Refsh := tau (.i.) - 1;
   Samsh := lo;
```

Call the pressure correlation routine

```
   Pcorr (Refsh,Samsh,Len,Samz,Refz,Pscorr);
```

Save the max pscore and corresponding shift value

```
   IF Pscorr > Pmax THEN BEGIN
                         Pmax   := Pscorr;
                         Pshmax := tau (.i.);
                         Olapp  := Len;
                         END;
   END;                end the i-loop

END;
=====
SEGMENT ACCMOD;

PROCEDURE Acorr    (Refsh,Samsh,Len:Integer;
                    Samx,Samy,Refx,Refy:segdata;
                    VAR Ascorr:Real);EXTERNAL;
```

PROCEDURE ACORR

Function: To calculate the acceleration
             correlation score.

|    | Type   | I/O | Purpose |
|----|--------|-----|---------|
| 1) | Refsh  | Inp | Reference segment offset |
| 2) | Samsh  | Inp | Sample    segment offset |
| 3) | Len    | Inp | No. pts in correlation |
| 4) | Samx   | Inp | Sample   - x component |
| 4) | Samy   | Inp | Sample   - y component |
| 5) | Refx   | Inp | Reference - x component |
| 5) | Refy   | Inp | Reference - y component |
| 6) | Ascorr | Out | Acceleration score |

```
PROCEDURE Accshift (Reflen,Samlen:INTEGER;
                    Refx,Refy,Samx,Samy:segdata;
                    VAR Amax:REAL;
                    Pshmax:INTEGER
                    VAR Olapa:INTEGER);EXTERNAL;
```

Function: To call the acceleration correlaton routine at
the shift value found by the pressure correlation
routine.

|    | Name   | I/O | Type | Purpose |
|----|--------|-----|------|---------|
| 1) | Reflen | Inp | Ref  | No. pts. in ref segment |
| 2) | Samlen | Inp | Ref  | No. pts. in sam segment |
| 3) | Refx   | Inp | Ref  | Reference - x component |
| 4) | Refy   | Inp | Ref  | Referemce - y component |
| 5) | Samx   | Inp | Ref  | Sample    - x component |
| 6) | Samy   | Inp | Ref  | Sample    - y component |
| 7) | Amax   | Out | Ref  | Score - acceleration |
| 8) | Pshmax | Inp | Ref  | Prs Shift - max prs score |
| 9) | Olapa  | Out | Ref  | Overlap length - Prs |

PROCEDURE ACCSHIFT;

BEGIN (*ACCSHIFT

Now perform the -1 0 +1 shifting for the acceleration correlation.

```
tauct := 3; three shift values - beginning from pshmax-1

FOR i := 1 TO tauct DO tau (.i.) := Pshmax - 2 + i;
FOR i := 1 TO tauct DO
   BEGIN
   lo := MAX(0,MIN(tau(.i.),Samlen-1));
   IF tau (.i.) < 0 THEN up := MIN(Samlen-1,MAX(Reflen+tau(.i.)-1,0))
                    ELSE up := MAX(0,MIN(Reflen+tau(.i.)-1,Samlen-1));
   Len := up - lo + 1;
   IF (lo - tau (.i.))  >= 0 THEN Refsh := lo - tau (.i.)
                             ELSE Refsh := tau (.i.) - 1;
   Samsh := lo;
```

```
    Call the acceleration correlation procedure and
    save the best acceleration score for this segment.

Acorr (Refsh,Samsh,Len,Samx,Samy,Refx,Refy,Ascore);

IF Ascore > Amax THEN BEGIN
                   Amax   := Ascore;
END;        end the i-loop

END;
```

Like the invention disclosed in the above referenced application Ser. No. 567,201 of Chainer et al, the present invention makes the signature verification system more resistant to forgeries. This results from the fact that the two techniques remove a degree of freedom which is not used by valid signers. Specifically, valid signers naturally keep their pressure and acceleration signals in synchronism, while forgers do not necessarily accomplish this. This advantage has been demonstrated by empirical data which is summarized by the following table:

| Type I Error Rate | Type II Error Rate | Shift Technique |
| --- | --- | --- |
| 14.9% | 0.4% | Semi-Independent |
| 18.3% | 0.4% | Pressure Only |
| 19.8% | 0.2% | Semi-Independent |
| 20.7% | 0.2% | Pressure Only |
| 22.8% | 0.1% | Semi-Independent |
| 23.8% | 0.1% | Pressure Only |

The semi-independent shift technique according to the present invention exhibits an enhanced performance over both the pressure only and the independent shift techniques.

Thus, it will be appreciated from the foregoing description of the preferred embodiment of the invention that the signature verification system performance is enhanced with only a modest increase in computation time as compared to the pressure only shifting technique. When compared to the independent shifting technique, computation time is still greatly reduced.

Having thus described our invention, what we claim as new, and desire to secure by Letters Patent is:

1. In a signature verification process including the steps of obtaining acceleration data and pressure data related to a given signature and comparing said data with reference data previously obtained from an identified signer, the improvement which comprises a method of enhancing the correlation or representative segments of the acceleration data which includes the steps of performing correlations of respective segments of a reference pressure signal and a sample pressure signal by successively measuring the correlation as the two signals are shifted with respect to one another, storing the shift values which produce the maximum correlation between each pair of pressure signal segments, and shifting corresponding segments of acceleration data with respect to one another by an amount which is ±1 time units of the stored shift values during subsequent correlations of the acceleration data.

2. The method according to claim 1 wherein the pressure data is directly proportional to a pressure signal measured at the stylus of a writing instrument when a person writes his or her signature.

3. The method according to claim 1 wherein the pressure data is proportional to the first time derivative of a pressure signal measured at the stylus of a writing instrument when a person writes his or her signature.

* * * * *